US012633219B2

(12) United States Patent
Pereira et al.

(10) Patent No.: US 12,633,219 B2
(45) Date of Patent: May 19, 2026

(54) SYSTEM FOR COLLABORATIVE BLIND SPOT MITIGATION

(71) Applicant: Torc Robotics, Inc., Blacksburg, VA (US)

(72) Inventors: Savio Pereira, Austin, TX (US); William Gray Davis, Austin, TX (US); Akshay Pai Raikar, Austin, TX (US); Joseph R. Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 33 days.

(21) Appl. No.: 18/745,517

(22) Filed: Jun. 17, 2024

(65) Prior Publication Data

US 2025/0384773 A1 Dec. 18, 2025

(51) Int. Cl.
*G08G 1/16* (2006.01)
*G08G 1/0967* (2006.01)

(52) U.S. Cl.
CPC ....... *G08G 1/167* (2013.01); *G08G 1/096725* (2013.01); *G08G 1/096791* (2013.01); *G08G 1/163* (2013.01); *G08G 1/166* (2013.01)

(58) Field of Classification Search
None
See application file for complete search history.

(56) References Cited

U.S. PATENT DOCUMENTS 8,947,531 B2 2/2015 Fischer et al.
9,475,422 B2 10/2016 Hillis et al.
9,494,943 B2 11/2016 Harvey
9,606,535 B2 3/2017 Humenay
9,858,817 B1 * 1/2018 Bletzer .................. G08G 1/163
10,068,485 B2 9/2018 Dudar
10,388,168 B2 8/2019 Deragarden et al.
10,698,421 B1 6/2020 Harris et al.
(Continued)

FOREIGN PATENT DOCUMENTS

JP WO2015068502 A1 * 3/2017 ............... G08G 1/22

OTHER PUBLICATIONS

Locomotion, Inc., Re-Engineering the World's Supply Chain with Autonomy. Retrieved online at: https://www.linkedin.com/company/locomotion/about/. 1 page, (2018).

*Primary Examiner* — Arslan Azhar
(74) *Attorney, Agent, or Firm* — McCarter & English, LLP

(57) ABSTRACT

A system for collaborative blind spot mitigation is provided. The system includes a first vehicle including one or more sensors configured to provide visibility coverage around the first vehicle such that no blind spots exist in the visibility coverage. The system includes a second vehicle including one or more sensors configured to provide at least partial visibility coverage around the second vehicle. If a blind spot exists in the visibility coverage around the first vehicle upon operation failure of the one or more sensors of the first vehicle, data is collected from the one or more sensors of the second vehicle corresponding with visibility of the blind spot in the visibility coverage around the first vehicle and is used to supplement the data from the one or more sensors of the first vehicle to ensure that no blind spots exist in the visibility coverage around the first vehicle.

20 Claims, 7 Drawing Sheets

(56) References Cited

U.S. PATENT DOCUMENTS

| | | | |
|---|---|---|---|
| 10,816,972 B2 | 10/2020 | Michalakis et al. | |
| 11,009,868 B2 | 5/2021 | Ferguson et al. | |
| 11,163,303 B2 | 11/2021 | Costin et al. | |
| 11,232,711 B2 | 1/2022 | Lacaze | |
| 11,320,838 B2 | 5/2022 | Lopez | |
| 11,372,406 B2 | 6/2022 | Agarwal | |
| 11,429,115 B2 | 8/2022 | Zhu | |
| 11,747,806 B1 | 9/2023 | Wootton et al. | |
| 11,860,642 B2 | 1/2024 | Amla et al. | |
| 11,875,682 B2 | 1/2024 | Agarwal | |
| 11,875,685 B2 | 1/2024 | Okuyama et al. | |
| 2010/0214085 A1* | 8/2010 | Avery | G08G 1/161 340/435 |
| 2015/0360617 A1* | 12/2015 | Schulz | B60W 30/06 340/576 |
| 2020/0074862 A1* | 3/2020 | Johnston | G08G 1/22 |
| 2021/0149404 A1 | 5/2021 | Zeng et al. | |
| 2023/0131387 A1 | 4/2023 | Salehi et al. | |
| 2023/0269564 A1 | 8/2023 | Qi | |
| 2023/0349999 A1 | 11/2023 | Newman et al. | |
| 2024/0089736 A1* | 3/2024 | Monteuuis | H04L 63/1416 |
| 2024/0394931 A1* | 11/2024 | Balasubramanian | G06V 10/757 |

* cited by examiner

SYSTEM FOR COLLABORATIVE BLIND SPOT MITIGATION

TECHNICAL FIELD

The field of the disclosure relates to blind spot mitigation and, in particular, to a system for collaboratively mitigating blind spots for an autonomous vehicle.

BACKGROUND

Autonomous vehicles employ fundamental technologies such as perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Perception technologies can include various sensors disposed around the vehicle with each sensor having a field-of-view with coverage around a portion of the vehicle. In general, the field-of-views of the adjacent sensors overlap to ensure full coverage of the environment around the vehicle, thereby allowing the controller technologies associated with the vehicle to control operation of the vehicle along its route. If operation failure of one or more of the sensors occurs due to, e.g., mechanical or electrical failure of the sensor component(s), poor visibility due to an obstruction of the sensor (e.g., due to dirt), combinations there, of the like, one or more blind spots in the environment surrounding the vehicle exist. Such blind spots create a dangerous environment for any steering, braking and/or acceleration that may need to take place since such operation cannot be performed safely. Even guiding the autonomous vehicle to a safe location for repair of the failed sensor(s) is unsafe due to the existing blind spot(s).

Accordingly, there exists a need for a system and a method to collaboratively mitigate blind spots for an autonomous vehicle to allow for continued safe operation of the vehicle. These and other needs are met by the exemplary system for collaborative blind spot mitigation discussed herein.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an exemplary system for collaborative blind spot mitigation is provided. The system includes a first vehicle including one or more sensors configured to provide visibility coverage around the first vehicle such that no blind spots exist in the visibility coverage. The first vehicle includes a first processing device. The system includes a second vehicle including one or more sensors configured to provide at least partial visibility coverage around the second vehicle. The second vehicle includes a second processing device. The first processing device and the second processing device are in communication with each other. If a blind spot exists in the visibility coverage around the first vehicle upon operation failure of the one or more sensors of the first vehicle, the first processing device and/or the second processing device are configured to execute instructions stored in a memory to perform certain operations. The operations include collecting data from the one or more sensors of the second vehicle corresponding with visibility of the blind spot in the visibility coverage around the first vehicle. The operations include at least one of (i) transmitting the data corresponding with the visibility of the blind spot from the second vehicle to the first vehicle, or (ii) transmitting data from the one or more sensors of the first vehicle corresponding with the visibility coverage around the first vehicle to the second vehicle. The operations include supplementing the data from the one or more sensors of the first vehicle with the data from the second vehicle to ensure that no blind spots exist in the visibility coverage around the first vehicle.

In some embodiments, the first vehicle can be an autonomous vehicle. In some embodiments, the second vehicle can be an autonomous vehicle or a non-autonomous vehicle. The operations can be performed in real-time to minimize a magnitude of the blind spot around the first vehicle. The visibility coverage around the first vehicle provided by the one or more sensors can include visibility in front of the first vehicle, behind the first vehicle, and on the right and left sides of the first vehicle. In some embodiments, the one or more sensors of the first vehicle can include overlapping field-of-views to provide the visibility coverage around the first vehicle. The partial visibility coverage provided by the one or more sensors of the second vehicle can include a field-of-view that encompasses the blind spot in the visibility coverage around the first vehicle upon operation failure of the one or more sensors.

The operations can include receiving data at the second processing device from the one or more sensors of the first vehicle corresponding with the blind spot. The data can include the location and geometry of the blind spot relative to the first vehicle. Before the operation failure of the one or more sensors of the first vehicle, the first processing device can receive the data regarding the visibility coverage around the first vehicle from the one or more sensors, and generates an initial motion path for the first vehicle based on the data.

In some embodiments, upon the operation failure of the one or more sensors of the first vehicle, the operations can include receiving at the second vehicle the data from the one or more sensors of the first vehicle corresponding with the visibility coverage around the first vehicle, and generating an updated motion path for the first vehicle with the second processing device based on the supplemented data of the one or more sensors of the first vehicle and the data from the second vehicle associated with the visibility of the blind spot. The updated motion path can be generated based on no blind spots existing in the visibility coverage around the first vehicle. The operations can include transmitting the updated motion path from the second vehicle to the first vehicle, and regulating operation of the first vehicle based on the updated motion path.

In some embodiments, upon the operation failure of the one or more sensors of the first vehicle, the operations can include receiving at the first vehicle the data from the second vehicle corresponding with the visibility of the blind spot, and generating an updated motion path for the first vehicle with the first processing device based on the supplemented data of the one or more sensors of the first vehicle and the data from the second vehicle associated with the visibility of the blind spot. The operations can include regulating operation of the first vehicle based on the updated motion path.

The operations can include continuously updating and receiving the data from the second vehicle corresponding with the visibility of the blind spot to ensure that collectively based on the data, no blind spots exist in the visibility coverage around the first vehicle. The operations can include maintaining the second vehicle in a position relative to the first vehicle such that visibility of the blind spot with the one or more sensors of the second vehicle remains. The operations can include maintaining the second vehicle within a minimum distance relative to the first vehicle such that communication between the first and second processing devices remains. The operations can include performing joint motion planning with the first and second processing devices based on the supplemented data from the first and second vehicles to generate a motion path for the first vehicle.

In another aspect, a computer-implemented method for collaborative blind spot mitigation is provided. The method includes providing visibility coverage around a first vehicle with one or more sensors associated with the first vehicle such that no blind spots exist in the visibility coverage. The first vehicle includes a first processing device. The method includes providing at least partial visibility coverage around a second vehicle with one or more sensors associated with the second vehicle. The second vehicle includes a second processing device. The first processing device and the second processing device are in communication with each other. If a blind spot exists in the visibility coverage around the first vehicle upon operation failure of the one or more sensors of the first vehicle, the method includes executing instructions stored in a memory with the first processing device and/or the second processing device to perform certain operations. The operations include collecting data from the one or more sensors of the second vehicle corresponding with visibility of the blind spot in the visibility coverage around the first vehicle. The operations include at least one of (i) transmitting the data corresponding with the visibility of the blind spot from the second vehicle to the first vehicle, or (ii) transmitting data from the one or more sensors of the first vehicle corresponding with the visibility coverage around the first vehicle to the second vehicle. The operations include supplementing the data from the one or more sensors of the first vehicle with the data from the second vehicle to ensure that no blind spots exist in the visibility coverage around the first vehicle.

In some embodiments, the method includes receiving data at the second processing device from the one or more sensors of the first vehicle corresponding with the blind spot. The data includes the location and geometry of the blind spot relative to the first vehicle. In some embodiments, before the operation failure of the one or more sensors of the first vehicle, the method includes receiving at the first processing device the data regarding the visibility coverage around the first vehicle from the one or more sensors, and generating an initial motion path for the first vehicle based on the data. In some embodiments, upon the operation failure of the one or more sensors of the first vehicle, the method includes receiving at the first vehicle the data from the second vehicle corresponding with the visibility of the blind spot, and generating an updated motion path for the first vehicle with the first processing device based on the supplemented data of the one or more sensors of the first vehicle and the data from the second vehicle associated with the visibility of the blind spot.

In yet another aspect, a non-transitory computer-readable medium storing instructions for collaborative blind spot mitigation that are executable by a processing device is provided. Execution of the instructions by the processing device causes the processing device to provide visibility coverage around a first vehicle with one or more sensors associated with the first vehicle such that no blind spots exist in the visibility coverage. The first vehicle includes a first processing device. Execution of the instructions by the processing device causes the processing device to provide at least partial visibility coverage around a second vehicle with one or more sensors associated with the second vehicle. The second vehicle includes a second processing device. The first processing device and the second processing device are in communication with each other. If a blind spot exists in the visibility coverage around the first vehicle upon operation failure of the one or more sensors of the first vehicle, the processing device collects data from the one or more sensors of the second vehicle corresponding with visibility of the blind spot in the visibility coverage around the first vehicle. If a blind spot exists in the visibility coverage around the first vehicle upon operation failure of the one or more sensors of the first vehicle, the processing device at least one of (i) transmits the data corresponding with the visibility of the blind spot from the second vehicle to the first vehicle, or (ii) transmits data from the one or more sensors of the first vehicle corresponding with the visibility coverage around the first vehicle to the second vehicle. If a blind spot exists in the visibility coverage around the first vehicle upon operation failure of the one or more sensors of the first vehicle, the processing device supplements the data from the one or more sensors of the first vehicle with the data from the second vehicle to ensure that no blind spots exist in the visibility coverage around the first vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
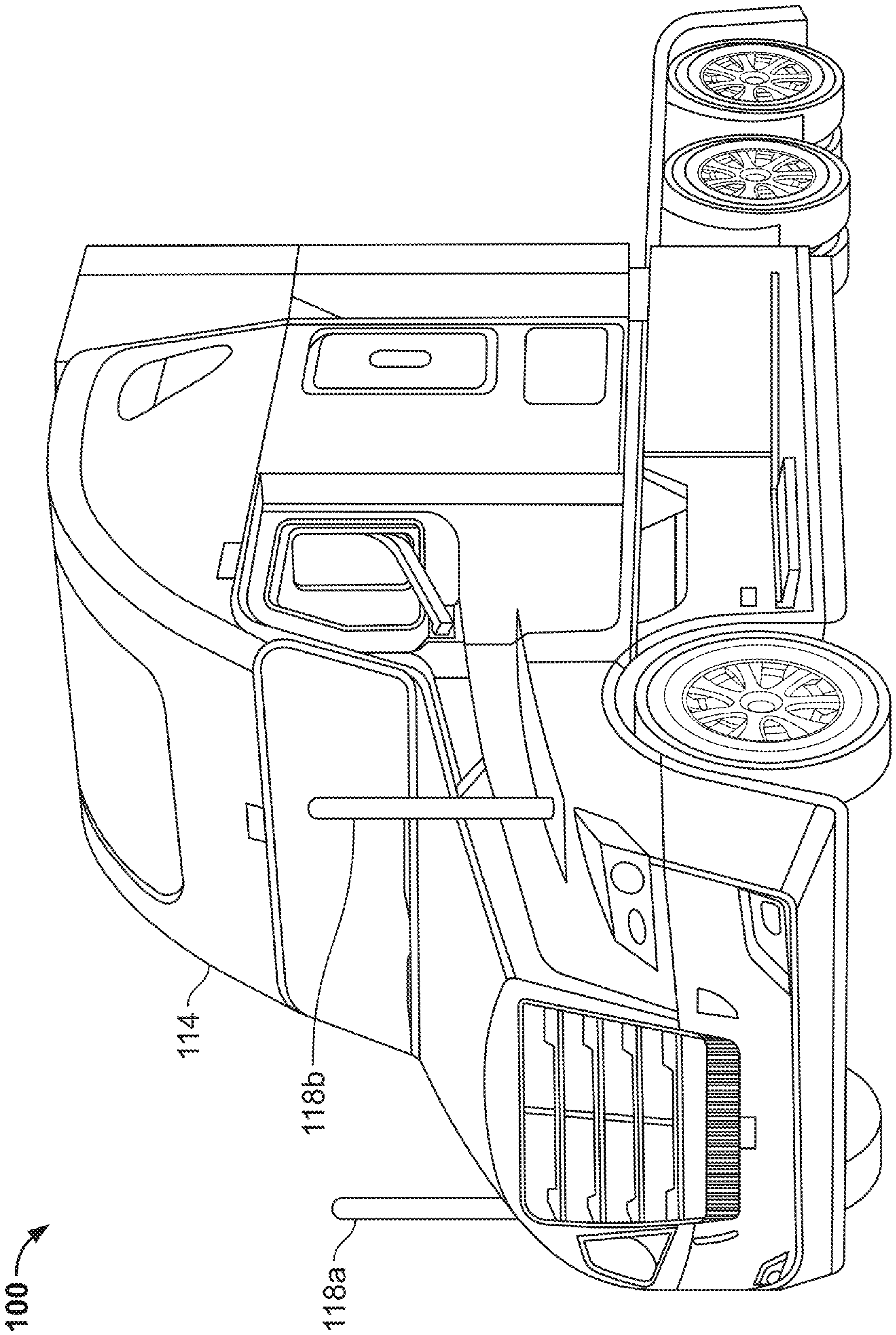
FIG. 1 is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

As described herein, autonomous vehicles are capable of performing the controlling or regulating operations based on multiple sensors positioned around the vehicle. Each sensor has a field-of-view, and adjacently disposed sensors (or the sensors in general) can have overlapping fields-of-view to prevent or minimize any blind spots around the vehicle. The sensors therefore detect any obstacles around the vehicle such that the vehicle can perform the controlling or regulating operations safely while avoiding any potential obstacles.

In some instances, one or more of the sensors can have an operation failure. As the term is used herein, "operation failure" refers to any type of inability of the sensors to detect (e.g., visually) the entire environment in its respective field-of-view. Such operation failure can occur due to a complete mechanical and/or electrical failure of the sensor (e.g., a technical failure), such that the sensor is effectively in an "off" position. However, such operation failure can also occur due to an obstruction of the field-of-view due to, e.g., an object located adjacent to the vehicle and blocking the field-of-view, dirt on the lens of the sensor, combinations thereof, or the like.

When an operation failure occurs for one or more sensors of the autonomous vehicle, the traditional reaction for the system is to perform a minimal risk maneuver (MRM), e.g., pulling over safely onto the shoulder, pulling into a parking area, or the like. Often a single sensor failure is sufficient to trigger an MRM since the sensor failure can result in the vehicle having a blind spot in a critical area. For example, if one of the left-side sensors fails, then the vehicle has a blind spot to its left and cannot perform critical behaviors, such as left lane changes. The MRM can be performed while avoiding any blind spots created by the sensor failure.

However, taking a vehicle offline for a simple sensor failure, especially if it is intermittent, is expensive and often an unnecessary procedure. In most instances, even with a sensor operation failure, the vehicle itself is capable of continuing along its programmed route so long as the blind spot area is supplemented or mitigated by supporting data from another vehicle (e.g., a rescuer). When a fleet of vehicles exists, some vehicles may travel along the same route (or at least partially along the same route), allowing for supplementing of missing sensor data to cover the blind spot region of the failed sensor on another vehicle. The exemplary system discussed herein can therefore be used to save time and money for operating the vehicle (referred to as the rescuee) by covering and mitigating the blind spot sensor data by using other vehicle(s) (referred to as the rescuer) in the fleet equipped with similar sensors that are traveling along the same route.

In some embodiments, multiple rescuer vehicles can be used to supplement the blind spot data along the route, with each rescuer vehicle covering a portion of the rescuee route and overlapping in coverage to ensure the supplemented data is continuously provided to the rescuee vehicle. Thus, vehicles traveling along the same route as the rescuee can be used to collect data associated with the blind spot of the rescuee, allowing for the rescuee to continue its route without taking the vehicle offline. In some embodiments, the rescuee can be guided to its final location in this manner. In some embodiments, the rescuee can be guided to a repair area in this manner to correct the operational failure of the sensor.

The system uses one or more other vehicles (e.g., rescuer vehicles) equipped with sensors suitable for assisting in supplementing the failed sensor of the rescuee vehicle. The sensors can be the same or similar as the failed sensor. The rescuer can be any vehicle equipped with one or more of the sensors (e.g., a sensor suite) and on-board computing infrastructure such that the vehicle can detect and track relevant objects in the environment around the rescuee vehicle. In some embodiments, the rescuer vehicle can be another autonomous or semi-autonomous vehicle traveling along the same route as the rescuee vehicle (e.g., traveling the same route up to the same final location, traveling along the same route for a portion of the route and diverging from the route at a later time, or the like). In some embodiments, the rescuer vehicle can be a dedicated rescue vehicle whose main purpose is to assist the rescuee vehicle in safely navigating to the nearest hub where the sensor failure can be addressed/repaired (or the vehicle's final destination).

In some embodiments, a single rescuer vehicle can be used for the entire duration of the route of the rescuee vehicle. In some embodiments, multiple rescuer vehicles can be used with overlapping route coverage to assist in guiding the rescuee vehicle. For example, one rescuer vehicle can be used along route section A before diverging from the route to its intended destination, and another rescuer vehicle can be used along route section B. The second rescuer vehicle would join the route within the end of section A such that an overlap in coverage is provided. In some embodiments, two or more rescuer vehicles can be used to supplement the blind spot coverage during the same portion of the route. For example, if sensor operation failure occurs on the front and rear of the rescuee vehicle and a single rescuer vehicle is incapable of supplementing this blind spot data, one rescuer vehicle can be used to supplement the blind spot at the front of the rescuee vehicle and another rescuer vehicle can be used to supplement the blind spot at the rear of the rescuee vehicle. Thus, although the examples provided herein discuss a single rescuer vehicle for simplicity, it should be understood that one or more rescuer vehicles could be used in a similar manner.

The rescuer vehicle therefore provides sensor coverage within or of the blind spot region of the rescuee vehicle. The rescuer and rescuee vehicles communicate with each other via, e.g., a wireless communication channel such as a dedicated short-range communication (DSRC) service (see https://www.fcc.gov/wireless/bureau-divisions/mobility-division/dedicated-short-range-communications-dsrc-service). The rescuee vehicle transmits a query to the rescuer describing its blind spot region. In some embodiments, the blind spot region can be in the form of a two-dimensional (2D) polygon associated with the failed sensor(s). The rescuer vehicle analyzer the request in the query, positions itself such that the rescuer vehicle's sensor(s) have a field-of-view that covers the blind spot region requested, and transmits back information about dynamic and static object tracks that are contained within the blind spot region. This data thereby supplements the missing data from the sensors of the rescuee vehicle, and allows the rescuee vehicle to continue along its route.

In some embodiments, the rescuer vehicle transmits the supplemental data to the rescuee vehicle and the rescuee vehicle creates its motion plan to reach the intended destination. In some embodiments, the rescuee vehicle transmits all environment sensor data to the rescuer vehicle, the rescuer vehicle supplements the missing blind spot region data with sensor data from its own sensors, the rescuer vehicle creates the motion plan for the rescuee vehicle based on the collective sensor data (e.g., joint motion planning), and transmits the motion plan to the rescuee vehicle to guide the rescuee vehicle to the intended destination.

Throughout the collaborative sensor data transmission between the vehicles and in order to achieve a continuous, accurate joint motion planning algorithm between the rescuer and rescuee, it is crucial that the rescuer vehicle is always able to provide/transmit sensor coverage within the blind spot region of the rescuee vehicle. The objective of the motion planning algorithm is to safely have the rescuer and rescuee reach a destination hub for repair of the failed sensor or any other intended destination along the route. The rescuer and rescuee vehicles should therefore always remain within sufficient proximity to each other to ensure reliable communication over the wireless channel. In some embodiments, such proximity for wireless communication can be about, e.g., 1000 m or less, 200-1000 m inclusive, 300-1000 m inclusive, 400-1000 m inclusive, 500-1000 m inclusive, 600-1000 m inclusive, 700-1000 m inclusive, 800-1000 m inclusive, 900-1000 m inclusive, 200-900 m inclusive, 200-800 m inclusive, 200-700 m inclusive, 200-600 m inclusive, 200-500 m inclusive, 200-400 m inclusive, 200-300 m inclusive, 300-800 m inclusive, 400-600 m inclusive, 200 m or less, 300 m or less, 400 m or less, 500 m or less, 600 m or less, 700 m or less, 800 m or less, 900 m or less, 1000 m or less, or the like.

The rescuer vehicle should always be in a vantage point to be able to provide a specified amount of minimum sensor coverage within the blind spot region of the rescuee vehicle, thereby supplementing the blind spot region data and preventing or minimizing the rea of the blind spot region created by the failed sensor of the rescuee vehicle. The rescuer vehicle sensor must therefore have a field-of-view of the blind spot region at all times (or ideally all times, depending on surrounding traffic). In some embodiments, to ensure that the rescuer vehicle sensor has a field-of-view within the blind spot region at all times, the distance between the rescuer vehicle and the rescuee vehicle can be maintained at about, e.g., 200-400 m inclusive, 200-350 m inclusive, 200-300 m inclusive, 200-250 m inclusive, 250-400 m inclusive, 300-400 m inclusive, 350-400 m inclusive, 250-350 m inclusive, 200 m or less, 250 m or less, 300 m or less, 350 m or less, 400 m or less, or the like.

The rescuee vehicle is thereby guided by the system with supplemental data corresponding to the blind spot region(s) such that the rescuee vehicle can reach either its ultimate designation along the route or a hub at which the failed sensor can be repaired/replaced. The system avoids the need to pull the vehicle from the road completely, thereby reducing costs associated with operating the fleet of vehicles along their routes.

Various embodiments in the present disclosure are described with reference to FIGS. 1-6 below.

FIG. 1 illustrates a vehicle 100, such as a truck that may be conventionally connected to a single or tandem trailer to transport the trailer (not shown) to a desired location. The vehicle 100 includes a cabin 114 that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin 114.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors. For example, the vehicle 100 can include one or more antenna 118*a*, 118*b* at or near the front of the vehicle 100 with sensors having a field-of-view at the front and/or sides of the vehicle 100.

Similar sensors can be used around the perimeter of the vehicle 100 to ensure full environmental coverage around the vehicle 100 is provided by the sensors. In some embodiments, the vehicle 100 can include, e.g., 5-6 LIDAR sensors, 8-10 cameras, combinations thereof, or the like. In some embodiments, the vehicle 100 can tow a trailer and the trailer can similarly include LIDAR sensors and/or cameras to provide field-of-view coverage around the perimeter of the vehicle 100 and the trailer. The environmental coverage by the sensors and/or cameras therefore provides data corresponding with the front, rear, sides and corners of the vehicle 100 and the trailer hauled by the vehicle 100.

Figure 2:
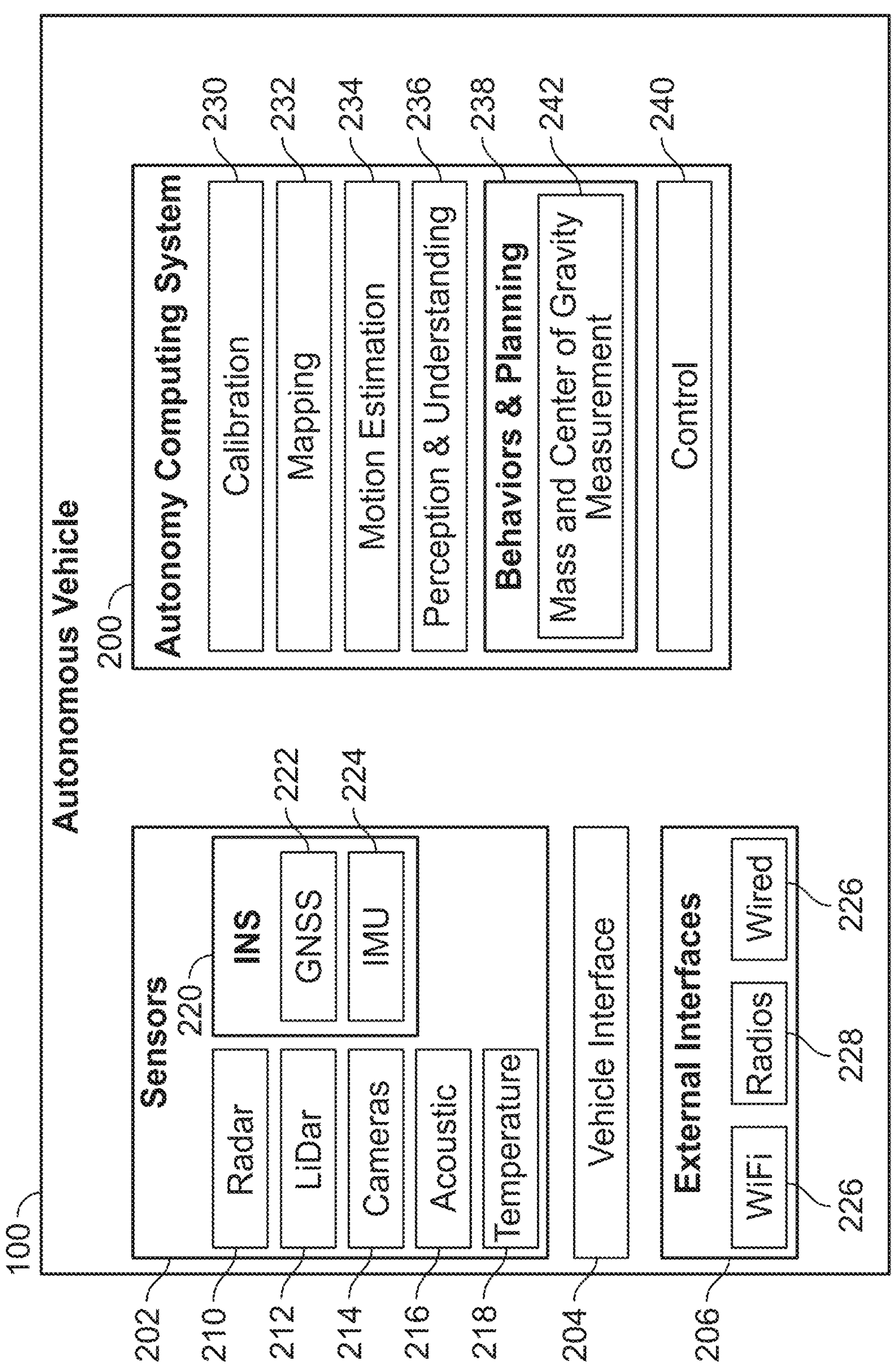
FIG. 2 is a block diagram of the autonomous truck shown in FIG. 1.

FIG. 2 is a block diagram of the autonomous vehicle 100 shown in FIG. 1 (e.g., the software stack of the autonomous vehicle 100). In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

In some embodiments, the image data generated by cameras 214 may be transmitted to mission control for one or more of identifying one or more construction markers (or nodes), generating one or more connectivity graphs based upon identified construction markers (or nodes), updating a reference path based upon the one or more connectivity graphs, transmitting the updated reference path to the autonomy vehicle 100 for guiding autonomous vehicle 100 to drive on the updated reference path.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100. In some embodiments, the trailer associated with the vehicle 100 can include similar sensors 202 for gathering similar data associated with the trailer, thereby further assisting with control operations of the autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5*g*, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway. In some embodiments, the external interfaces 206 can be used to communicate with other vehicles (e.g., rescuer vehicles).

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and an object detection and reference path generator module 242. The object detection and reference path generator module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The object detection and reference path generator module 242 may perform one or more tasks including, but not limited to, identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
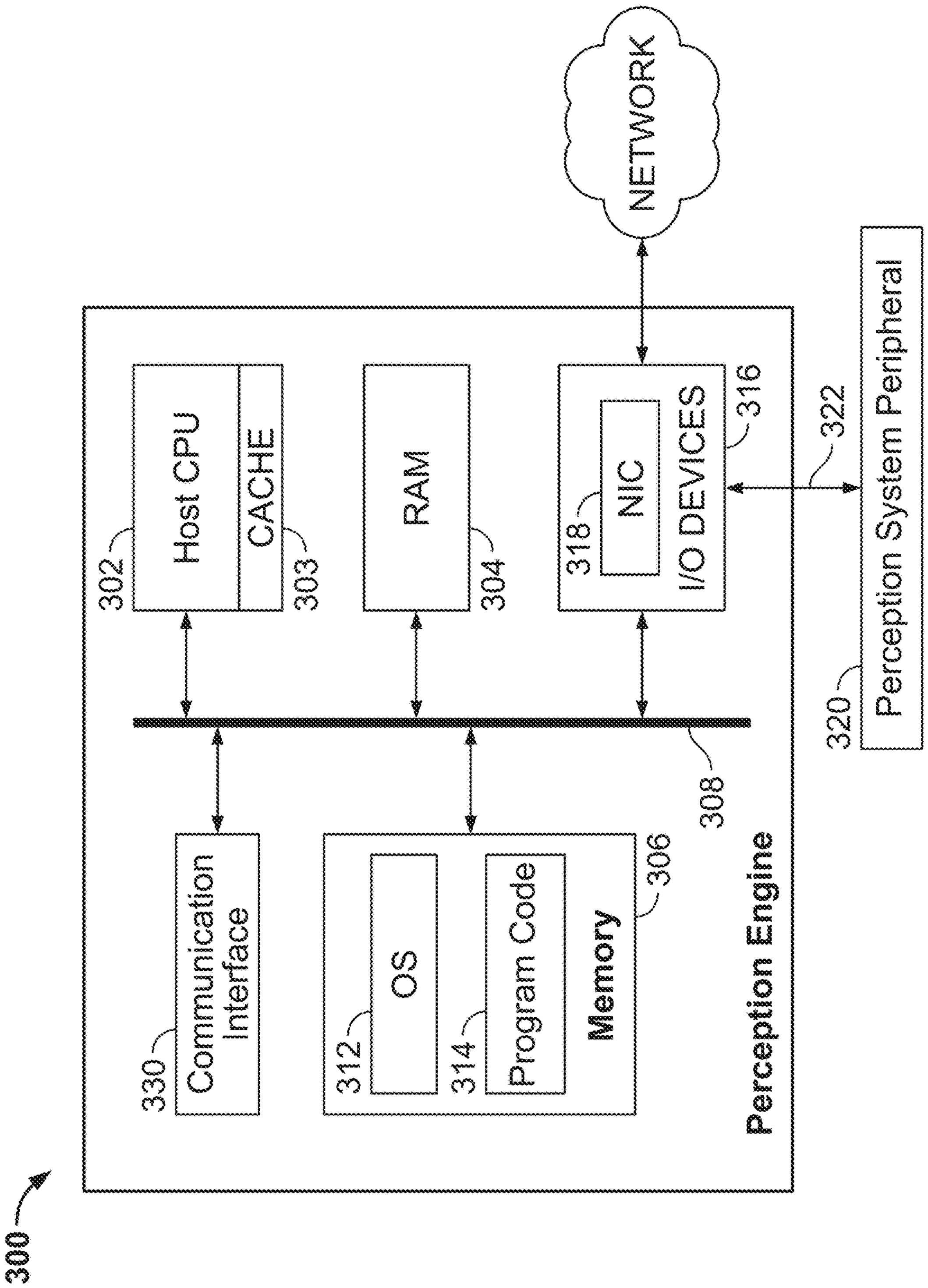
FIG. 3 is a block diagram of an example computing system.

FIG. 3 is a block diagram of an example computing system 300, such as the autonomy computing system 200 shown in FIG. 2, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 2. In alternative embodiments, one or more sections of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 4:
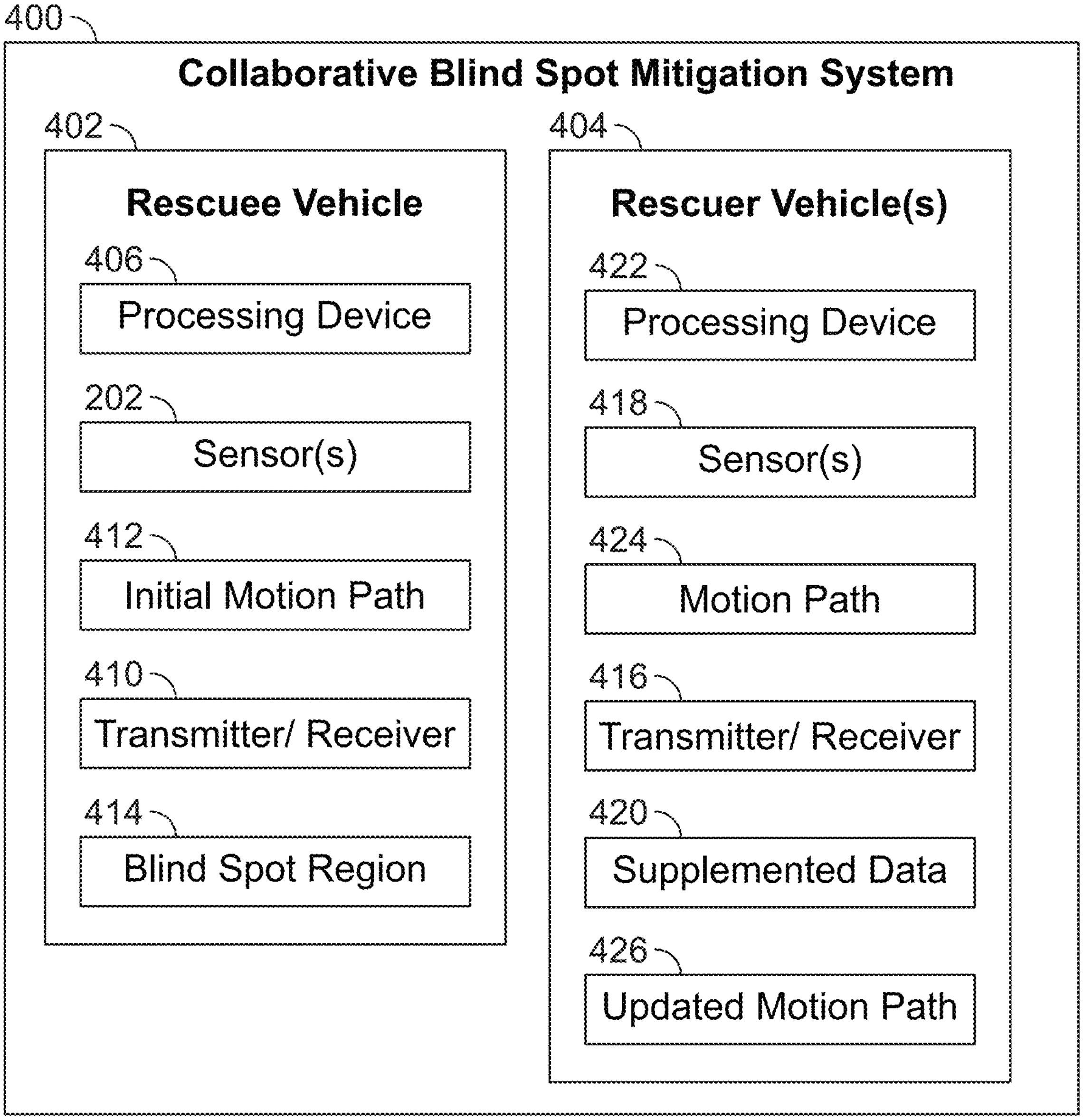
FIG. 4 is a block diagram of an exemplary system for collaborative blind spot mitigation.

FIG. 4 is a block diagram of an exemplary collaborative blind spot mitigation system 400. The system 400 generally includes a rescuee vehicle 402 (i.e., the vehicle having one or more sensors with a failed operation status, such as the autonomous vehicle 100) and one or more rescuer vehicles 404 (i.e., vehicles that supplement the failed sensors of the rescuee vehicle 402 to mitigate or prevent the blind spot created by the failed sensors). The rescuee vehicle 402 generally includes a processing device 406 (e.g., such as computing system 200, computing system 300, combinations thereof, or the like) configured to receive and process data from one or more sensors 202 (e.g., sensors 202 of FIG. 2). The rescuee vehicle 402 includes a transmitter/receiver 410 (e.g., such as external interface 206, communication interface 330, or the like) that allows for communication with other vehicles (e.g., the rescuer vehicles 404), as well as a central hub or intermediate hubs that communicate with the rescuee vehicle 402.

The sensors 202 each include a field-of-view that can overlap such that, in combination, the sensors 202 provide 100% coverage of the environment surrounding the rescuee vehicle 402 as it moves along its initial motion path 412 (e.g., a route to a final destination and/or intermediate destinations). If one or more of the sensors 202 fail in operation, coverage of the environment surrounding the rescuee vehicle 402 is reduced and one or more blind spot regions 414 are created due to the lack of coverage. The blind spot region 414 data includes at least the size, shape, and position/location of the blind spot. The existence of the blind spot region(s) 414 is transmitted to the processing device 406 which, in turn, can transmit a request or query for supplemental information from one or more rescuer vehicles 404 that may be traveling along the same route (at least for a temporary period of time).

The request for supplemental information can be received by the rescuer vehicles 404 in the vicinity of the rescuee vehicle 402 via a transmitter/receiver 416 (e.g., such as external interface 206, communication interface 330, or the like) of the rescuer vehicle 404. If no rescuer vehicles 402 are in the area, the system 400 can request a rescuer vehicle 404 to move into the vicinity of the rescuee vehicle 402 to provide the supplemental sensor data. The rescuer vehicle 404 also includes sensors 418 which may or may not be the same as the sensors 202 of the rescuee vehicle 402. However, the sensors 418 are capable of generating supplemental data 420 that provides coverage of the blind spot region 414. The rescuer vehicle 404 receives data corresponding with the blind spot region 414 from the rescuee vehicle 402 and a processing device 422 adjusts the motion path 424 of the rescuer vehicle 404 such that the sensors 418 can cover the blind spot region 414 of the rescuee vehicle 402.

Based on the supplemented data 420, the processing device 422 can generate an updated motion path 426 for the rescuee vehicle 402. The supplemented data 420 is provided in real-time to ensure that the rescuee vehicle 402 travels along the updated motion path 426 in the same manner as if the blind spot region 414 did not exist. The vehicles 402, 404 thereby collaborate to mitigate the blind spot region 414 and perform joint motion planning to ensure the vehicle 402 reaches its final destination or a hub for repair of the failed sensor 202 safely.

If the blind spot region 414 is too large to cover by a single rescuer vehicle 404, multiple rescuer vehicles 404 can be used. Similarly, if the blind spot region 414 is on opposite sides of the rescuee vehicle 402 (e.g., due to multiple sensor 202 failures), multiple rescuer vehicles 404 can be used. If rescuer vehicles 404 cannot supplement the blind spot region 414 and a sufficiently large percentage or area of the blind spot region 414 remains, the rescuee vehicle 402 can be directed to stop on the shoulder of the road immediately.

If the motion path 424 of the rescuer vehicle 404 does not coincide with the full updated motion path 426 of the rescuee vehicle 402, multiple rescuer vehicles 404 can be used in an overlapping manner such that the rescuee vehicle 402 has the necessary supplemented data 420 to complete its updated motion path 426. For example, a first rescuer vehicle 404 can complete a first part of the updated motion path 426, and a second rescuer vehicle 404 can complete a second part of the updated motion path 426, with overlap in-between to ensure supplemented data 420 is provided for the full updated motion path 426.

With respect to joint motion planning, each vehicle 402, 404 typically generates its own motion path 412, 424 individually/independently. However, upon a sensor 202 failure, the vehicles 402, 404 plan their motion paths jointly to ensure the updated motion path 426 is generated for safe passage of both vehicles 402, 404. During the joint planning stage, both vehicles 402, 404 must remain within the minimal proximity for communication without delay, and the rescuer vehicle 404 must remain in a position having a field-of-view with its sensors 418 of the blind spot region 414. If at any point surrounding vehicles pass within the field-of-view of the sensors 418 of the rescuer vehicle 404 needed to generate the supplemented data 420, the rescuer vehicle 404 can be operated to move to a position that would allow for the supplemented data 420 to be collected (e.g., ensuring the field-of-view covers the blind spot region 414). In some embodiments, if surrounding vehicles block the field-of-view of the blind spot region 414 by the sensors 418 for more than a predetermined period of time, e.g., 5 seconds, or the like, the rescuee vehicle 402 can be directed to failsafe mode by moving to the nearest shoulder in a safe manner. In some embodiments, as soon as a blind spot region 414 is detected, the rescuee vehicle 402 can be directed to failsafe mode by moving to the nearest shoulder in a safe manner.

In some embodiments, the joint motion planning can involve moving one or both vehicles into the right lane of the road to reduce chances of other vehicles passing in front of the field-of-view of the rescuer vehicle 404. The joint motion planning can also follow the normal rules of the road, e.g., not remaining in the left lane for extended periods of time. In some embodiments, only one of the vehicles 402, 404 can generate the joint motion plan, e.g., the updated motion path 426. In some embodiments, the rescuer vehicle 404 can perform the joint motion planning because it has all of the sensor data, i.e., data from the rescuee vehicle 402 and supplemented data 420 for the blind spot region 414. In some embodiments, the rescuee vehicle 402 can perform the joint motion planning by receiving the supplemented data 420 and using this data 420 to ensure the blind spot region 414 no longer exists, i.e., relying on the data 420 in making motion decisions.

Figure 5:
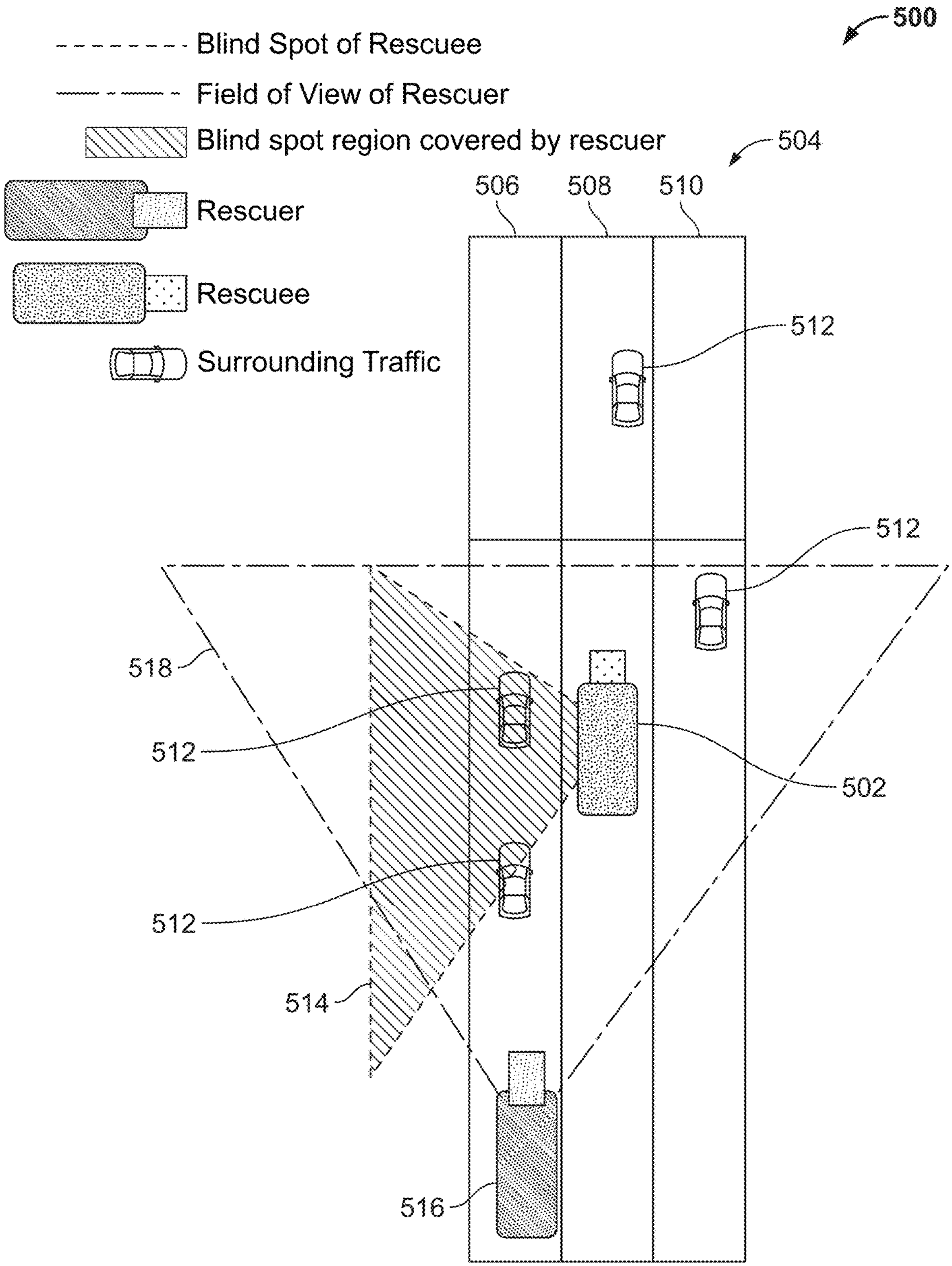
FIG. 5 is a schematic view of an environment in which an exemplary system for collaborative blind spot mitigation is used including a rescuee vehicle with a blind spot and a rescuer vehicle with a field-of-view covering the blind spot.
Figure 6:
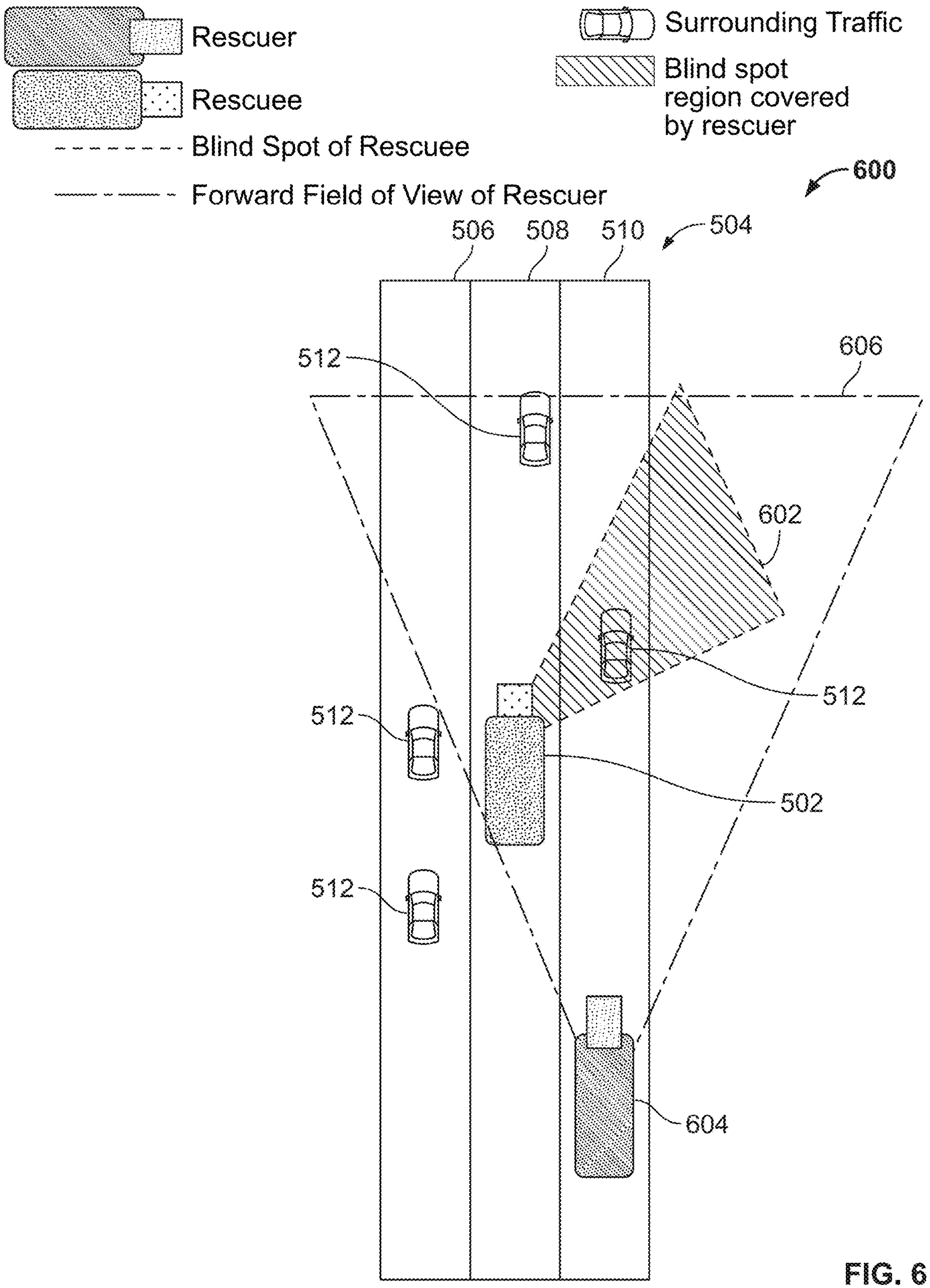
FIG. 6 is a schematic view of an environment in which an exemplary system for collaborative blind spot mitigation is used including a rescuee vehicle with a blind spot and a rescuer vehicle with a field-of-view covering the blind spot.

FIGS. 5 and 6 are schematics of environments 500, 600 in which the exemplary system 400 can be used. Same reference numbers are used to refer to same components. In each instance, a rescuee vehicle 502 is traveling along a road 504 having three lanes 506, 508, 510. Multiple vehicles 512 form surrounding traffic around the rescuee vehicle 502.

In FIG. 5, one or more failed sensors of the rescuee vehicles 502 create a blind spot region 514 on the left side of the vehicle 502. The blind spot region 514 defines a generally polygon shape. However, it should be understood that the blind spot region 514 can be any size and/or shape, depending on the number and/or type of sensors in operation failure status for the vehicle 502. With the blind spot region 514, the vehicle 502 is incapable of detecting the traffic vehicles 512 within the region 514. A query can be transmitted by the vehicle 502 to request supplemental coverage of the blind spot region 514 using one or more rescuer vehicles 516.

The rescuer vehicle 516 includes one or more sensors at the front of the vehicle 516 that create a field-of-view region 518. Although the rescuer vehicle 516 is using the sensors at the front of the vehicle 516, in some instances, sensors on the side or rear of the vehicle 516 could similarly be used. The system can determine the optimal sensors of the vehicle 516 to use for supplementing the blind spot region 514 data depending on, e.g., the position of the vehicle 502, the position of the vehicle 516, the number of vehicles 512, the size of the road 504, combinations thereof, or the like.

As illustrated in FIG. 5, the field-of-view region 518 of the rescuer vehicle 516 defines a substantially triangular configuration and is capable of overlapping with only a portion of the blind spot region 514. Based on the size/configuration of the field-of-view region 518 and the blind spot region 514, the position of the vehicles 502, 516 on the road 504 can be determined to ensure full blind spot region 514 coverage is obtained by the field-of-view region 518. For example, the vehicle 502 can be directed to stay in the middle lane 508, which allows the vehicle 516 to remain in the left lane 506 and effectively monitor the blind spot region 514 in the left lane 506 completely. The non-overlapping area of the regions 514, 518 in this instances does not affect the joint motion planning, since this area is outside of the road 504.

The rescuer vehicle 516 generates supplemented data corresponding with the blind spot region 514 and generates an updated motion path for the vehicle 502 using the supplemented data. In such embodiments, the rescuer vehicle 516 receives sensor data for the vehicle 502 such that all data outside of the blind spot region 514 is available, and uses the supplemented data from the field-of-view region 518 to generate the updated motion path for the vehicle 502. In some embodiments, the supplemented data can be transmitted to the vehicle 502 and the vehicle 502 can generate its updated motion path with coverage of the blind spot region 514 provided by the supplemented data. The vehicle 502 can thereby safely travel along the road 504 and is guided to its final destination or to a hub for repair of the failed sensor(s).

FIG. 6 illustrates a blind spot scenario similar to the blind spot scenario of FIG. 5. However, based on failure of other sensors at the front and/or right side of the vehicle 502, the blind spot region 602 defines a triangular configuration at the front, right corner of the vehicle 502. In such instance, the vehicle 502 can be directed to remain in the central lane 508 and the rescuer vehicle 604 is positioned in the right lane 510. In this position, the field-of-view region 606 fully overlaps the blind spot region 602 and allows for supplemented data to be generated for the joint planning algorithm to take place. As an example, if the rescuee vehicle 502 had failed sensors that resulted in combined blind spot regions 514, 602, two rescuer vehicles 516, 604 could be used to generate supplemented data with field-of-view regions 518, 606 to safely guide the rescuee vehicle 502 along the road 504.

Figure 7:
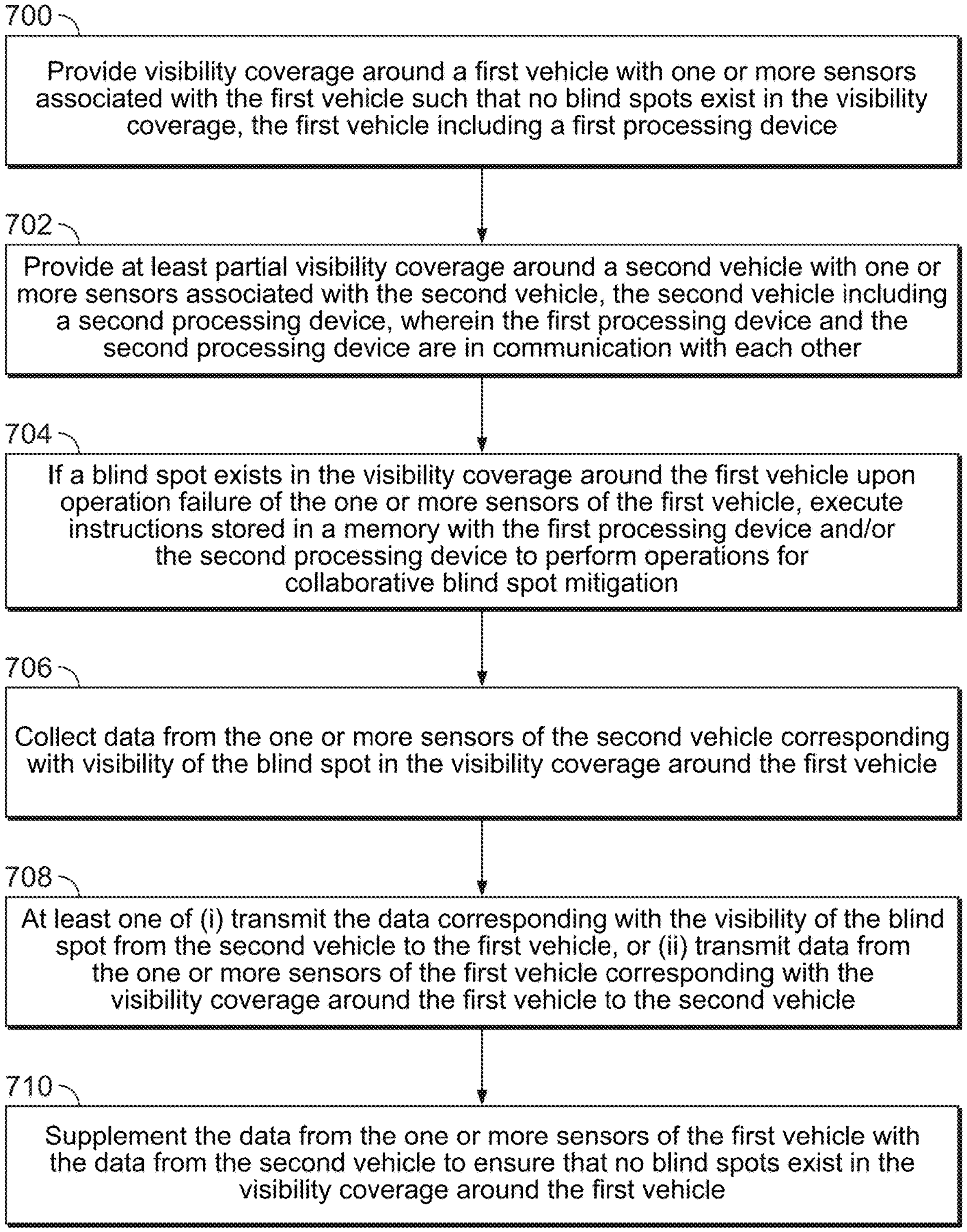
FIG. 7 is a flowchart of a method for collaborative blind spot mitigation.

FIG. 7 is a flowchart illustrating a method of implementing the exemplary system for collaborative blind spot mitigation. At step 700, the method includes providing visibility coverage around a first vehicle with one or more sensors associated with the first vehicle such that no blind spots exist in the visibility coverage, the first vehicle including a first processing device. At step 702, the method includes providing at least partial visibility coverage around a second vehicle with one or more sensors associated with the second vehicle, the second vehicle including a second processing device, wherein the first processing device and the second processing device are in communication with each other. At step 704, if a blind spot exists in the visibility coverage around the first vehicle upon operation failure of the one or more sensors of the first vehicle, the method includes executing instructions stored in a memory with the first processing device and/or the second processing device to perform operations for collaborative blind spot mitigation.

At step 706, the method includes collecting data from the one or more sensors of the second vehicle corresponding with visibility of the blind spot in the visibility coverage around the first vehicle. At step 708, the method includes at least one of (i) transmitting the data corresponding with the visibility of the blind spot from the second vehicle to the first vehicle, or (ii) transmitting data from the one or more sensors of the first vehicle corresponding with the visibility coverage around the first vehicle to the second vehicle. At step 710, the method includes supplementing the data from the one or more sensors of the first vehicle with the data from the second vehicle to ensure that no blind spots exist in the visibility coverage around the first vehicle.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term “non-transitory computer-readable media” is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., “software” and “firmware,” in a non-transitory computer-readable medium. As used herein, the terms “software” and “firmware” are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word “a” or “an” should be understood as not excluding plural elements or steps unless such exclusion is explicitly recited. Furthermore, references to “one embodiment” of the disclosure or an “exemplary” or “example” embodiment are not intended to be interpreted as excluding the existence of additional embodiments that also incorporate the recited features. Likewise, limitations associated with “one embodiment” or “an embodiment” should not be interpreted as limiting to all embodiments unless explicitly recited.

Disjunctive language such as the phrase “at least one of X, Y, or Z,” unless specifically stated otherwise, is generally intended, within the context presented, to disclose that an item, term, etc. may be either X, Y, or Z, or any combination thereof (e.g., X, Y, and/or Z). Likewise, conjunctive language such as the phrase “at least one of X, Y, and Z,” unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for collaborative blind spot mitigation, comprising:

a first vehicle including one or more sensors configured to provide visibility coverage around the first vehicle such that no blind spots exist in the visibility coverage, the first vehicle including a first processing device;

a second vehicle including one or more sensors configured to provide at least partial visibility coverage around the second vehicle, the second vehicle including a second processing device, wherein the first processing device and the second processing device are in communication with each other;

wherein when a blind spot exists in the visibility coverage around the first vehicle upon operation failure of the one or more sensors of the first vehicle, instructions stored in a memory are executed to perform operations comprising:

collecting data from the one or more sensors of the second vehicle corresponding with visibility of the blind spot in the visibility coverage around the first vehicle;

at least one of (i) transmitting the data corresponding with the visibility of the blind spot from the second vehicle to the first vehicle with the second processing device of the second vehicle, or (ii) transmitting data from the one or more sensors of the first vehicle corresponding with the visibility coverage around the first vehicle to the second vehicle with the first processing device of the first vehicle;

supplementing the data from the one or more sensors of the first vehicle with the data from the second vehicle to ensure that no blind spots exist in the visibility coverage around the first vehicle; and at least one of:

(i) maintaining the second vehicle in a position relative to the first vehicle such that the visibility of the blind spot with the one or more sensors of the second vehicle remains and, when one or more surrounding vehicles block the visibility of the blind spot of the one or more sensors of the second vehicle for more than a predetermined period of time, directing the first vehicle to a failsafe mode by moving to a nearest shoulder; or (ii) moving the first vehicle, the second vehicle, or both the first and second vehicles, into a rightmost lane of a road to reduce instances of one or more surrounding vehicles passing through the visibility of the blind spot of the one or more sensors of the second vehicle.

2. The system of claim 1, wherein the first vehicle is an autonomous vehicle.

3. The system of claim 1, wherein the operations are performed in real-time to minimize a magnitude of the blind spot around the first vehicle.

4. The system of claim 1, wherein the visibility coverage around the first vehicle provided by the one or more sensors includes visibility in front of the first vehicle, behind the first vehicle, and on the right and left sides of the first vehicle.

5. The system of claim 4, wherein the one or more sensors of the first vehicle include overlapping field-of-views to provide the visibility coverage around the first vehicle.

6. The system of claim 1, wherein the partial visibility coverage provided by the one or more sensors of the second vehicle include a field-of-view that encompasses the blind spot in the visibility coverage around the first vehicle upon operation failure of the one or more sensors.

7. The system of claim 1, wherein the operations further include receiving data at the second processing device from the one or more sensors of the first vehicle corresponding with the blind spot.

8. The system of claim 7, wherein the data includes the location and geometry of the blind spot relative to the first vehicle.

9. The system of claim 1, wherein before the operation failure of the one or more sensors of the first vehicle, the first processing device receives the data regarding the visibility coverage around the first vehicle from the one or more sensors, and generates an initial motion path for the first vehicle based on the data.

10. The system of claim 9, wherein the updated motion path is generated based on no blind spots existing in the visibility coverage around the first vehicle.

11. The system of claim 10, wherein the operations further comprise:

transmitting the updated motion path from the second vehicle to the first vehicle; and regulating operation of the first vehicle based on the updated motion path.

12. The system of claim 9, wherein upon the operation failure of the one or more sensors of the first vehicle, the operations further comprise:

receiving at the first vehicle the data from the second vehicle corresponding with the visibility of the blind spot; and generating an updated motion path for the first vehicle with the first processing device based on the supplemented data of the one or more sensors of the first vehicle and the data from the second vehicle associated with the visibility of the blind spot.

13. The system of claim 12, wherein the operations further comprise regulating operation of the first vehicle based on the updated motion path.

14. The system of claim 1, wherein the operations further comprise continuously updating and receiving the data from the second vehicle corresponding with the visibility of the blind spot to ensure that collectively based on the data, no blind spots exist in the visibility coverage around the first vehicle.

15. The system of claim 1, wherein the operations further comprise at least one of:

maintaining the second vehicle within a minimum distance relative to the first vehicle such that communication between the first and second processing devices remains.

16. The system of claim 1, wherein the operations further comprise performing joint motion planning with the first and second processing devices based on the supplemented data from the first and second vehicles to generate a motion path for the first vehicle.

17. A computer-implemented method for collaborative blind spot mitigation, comprising:

providing visibility coverage around a first vehicle with one or more sensors associated with the first vehicle such that no blind spots exist in the visibility coverage, the first vehicle including a first processing device;

providing at least partial visibility coverage around a second vehicle with one or more sensors associated with the second vehicle, the second vehicle including a second processing device, wherein the first processing device and the second processing device are in communication with each other; and wherein when a blind spot exists in the visibility coverage around the first vehicle upon operation failure of the one or more sensors of the first vehicle, executing instructions stored in a memory to perform operations comprising:

collecting data from the one or more sensors of the second vehicle corresponding with visibility of the blind spot in the visibility coverage around the first vehicle;

at least one of (i) transmitting the data corresponding with the visibility of the blind spot from the second vehicle to the first vehicle with the second processing device of the second vehicle, or (ii) transmitting data from the one or more sensors of the first vehicle corresponding with the visibility coverage around the first vehicle to the second vehicle with the first processing device of the first vehicle; and supplementing the data from the one or more sensors of the first vehicle with the data from the second vehicle to ensure that no blind spots exist in the visibility coverage around the first vehicle; and at least one of:

(i) maintaining the second vehicle in a position relative to the first vehicle such that the visibility of the blind spot with the one or more sensors of the second vehicle remains and, when one or more surrounding vehicles block the visibility of the blind spot of the one or more sensors of the second vehicle for more than a predetermined period of time, directing the first vehicle to a failsafe mode by moving to a nearest shoulder; or (ii) moving the first vehicle, the second vehicle, or both the first and second vehicles, into a rightmost lane of a road to reduce instances of one or more surrounding vehicles passing through the visibility of the blind spot of the one or more sensors of the second vehicle.

18. The computer-implemented method of claim 17, further comprising receiving data at the second processing device from the one or more sensors of the first vehicle corresponding with the blind spot, wherein the data includes the location and geometry of the blind spot relative to the first vehicle.

19. The computer-implemented method of claim 17, wherein before the operation failure of the one or more sensors of the first vehicle, the method comprises receiving at the first processing device the data regarding the visibility coverage around the first vehicle from the one or more sensors, and generating an initial motion path for the first vehicle based on the data.

20. The computer-implemented method of claim 17, wherein upon the operation failure of the one or more sensors of the first vehicle, the method comprises receiving at the first vehicle the data from the second vehicle corresponding with the visibility of the blind spot, and generating an updated motion path for the first vehicle with the first processing device based on the supplemented data of the one or more sensors of the first vehicle and the data from the second vehicle associated with the visibility of the blind spot.

* * * * *